US010084378B2

(12) United States Patent
Yoon et al.

(10) Patent No.: US 10,084,378 B2
(45) Date of Patent: Sep. 25, 2018

(54) SINGLE-INDUCTOR MULTI-OUTPUT CONVERTER

(71) Applicants: Kwang Ho Yoon, Seongnam-si (KR); JinSoo Jung, Goyang-si (KR)

(72) Inventors: Kwang Ho Yoon, Seongnam-si (KR); JinSoo Jung, Goyang-si (KR)

(73) Assignee: Silicon Mitus, Inc. (KR)

( * ) Notice: Subject to any disclaimer, the term of this patent is extended or adjusted under 35 U.S.C. 154(b) by 0 days.

(21) Appl. No.: 15/638,594

(22) Filed: Jun. 30, 2017

(65) Prior Publication Data

US 2018/0006557 A1 Jan. 4, 2018

(30) Foreign Application Priority Data

Jul. 4, 2016 (KR) .................. 10-2016-0084428

(51) Int. Cl.
- *G05F 1/577* (2006.01)
- *H02M 3/156* (2006.01)
- *H02M 3/07* (2006.01)

(52) U.S. Cl.
CPC ........... *H02M 3/156* (2013.01); *H02M 3/073* (2013.01); *H02M 2003/072* (2013.01); *H02M 2003/075* (2013.01)

(58) Field of Classification Search
CPC ............ H02M 3/156; H02M 3/073; H02M 2003/072; H02M 2003/075; H02M 2001/0067; H02M 2001/007; H02M 3/285; H02M 2001/008
USPC .................................. 323/266, 267
See application file for complete search history.

(56) References Cited

U.S. PATENT DOCUMENTS

| 5,751,139 | A | * | 5/1998 | Jordan | ................ | H02M 3/1588 323/222 |
| 6,222,352 | B1 | * | 4/2001 | Lenk | .................. | H02M 3/1588 323/267 |
| 2004/0201281 | A1 | * | 10/2004 | Ma | ....................... | H02M 3/158 307/38 |
| 2005/0088160 | A1 | * | 4/2005 | Tanaka | ................. | H02M 3/158 323/284 |
| 2012/0286576 | A1 | * | 11/2012 | Jing | ...................... | H02M 3/156 307/43 |

(Continued)

OTHER PUBLICATIONS

Chia-Min Chen, et. al., A Single-Inductor Multiple-Output Boost Converter, Sep. 17-21, 2012, IEEE 2012 Proceedings of the ESSCIRC (ESSCIRC), pp. 157-160.*

(Continued)

*Primary Examiner* — Alex Torres-Rivera
(74) *Attorney, Agent, or Firm* — Harness, Dickey & Pierce, P.L.C.

(57) ABSTRACT

A single-inductor multi-output converter that includes a charge pump unit, a current supply unit, a first output unit, and a second output unit. The charge pump unit may be positioned between a first node and a second node, and may store electric charges flowing into the first node and the second node through a first capacitor, or may supply electric charges to the second node. In addition, the current supply unit may: include an inductor positioned between an input node and the first node; build up current in the inductor in the first time period; and transfer the current of the inductor to the charge pump unit in the second time period.

6 Claims, 7 Drawing Sheets

(56) References Cited

U.S. PATENT DOCUMENTS

| | | | |
|---|---|---|---|
| 2012/0326691 A1* | 12/2012 | Kuan | H02M 3/158 323/299 |
| 2013/0082668 A1* | 4/2013 | Tseng | H02M 3/158 323/267 |
| 2014/0225577 A1* | 8/2014 | Ivanov | H02M 3/1582 323/225 |
| 2014/0232359 A1* | 8/2014 | Dash | H02M 3/158 323/235 |
| 2017/0271990 A1* | 9/2017 | Knoedgen | H02M 3/158 |

OTHER PUBLICATIONS

K. Takahashi, et al., "Single Inductor DC-DC Converter with Bipolar Outputs Using Charge Pump", IEEE 2010, pp. 460-463 (4 pages).

* cited by examiner

SINGLE-INDUCTOR MULTI-OUTPUT CONVERTER

CROSS-REFERENCE TO RELATED APPLICATION

This application claims priority from Korean Patent Application No. 10-2016-0084428, filed on Jul. 4, 2016, which is hereby incorporated by reference for all purposes as if fully set forth herein.

BACKGROUND OF THE INVENTION

The present invention relates to a multi-output converter for outputting two or more voltages.

A device that converts power using a switch (e.g., a power semiconductor) is referred to as a switched-mode converter.

A buck converter and a boost converter are widely known as switched-mode converter. The buck converter and the boost converter operate to build up current in an inductor in a period of switch-on and to output the built up current in a period of switch-off.

Other switched-mode converters (e.g., a cuk converter, a flyback converter, or the like) operate in a similar manner as the above by building up current in an inductor and by storing the built up current in a capacitor or the like.

As described above, since the switched-mode converter uses the current that is built up in the inductor, it includes one or more inductors.

Meanwhile, when the conventional switched-mode converter outputs a single voltage, a desired voltage can be obtained by means of only one inductor. However, in the case of outputting two or more voltages (in the case of a multi-output), extra configurations are required in addition to a single inductor.

For example, a conventional switched-mode converter includes two or more inductors and builds up different forms of current in each inductor in order to thereby form two or more different voltages. Alternatively, a conventional switched-mode converter forms a single voltage using a single inductor and forms two or more different voltages using a transformer that has two or more outputs.

However, since the inductor and the transformer are manufactured by winding wires around a core, the inductor and the transformer have a large volume and a high unit price compared to other parts. Accordingly, the conventional switched-mode converter having an inductor or a transformer that is further added for a multi-output has a problem in that it is bulky and expensive.

SUMMARY OF THE INVENTION

In this background, an objective of the present invention is to provide a converter technology for outputting two or more voltages with a single inductor.

In order to accomplish the above objective, in one aspect, the present invention provides a single-inductor multi-output converter that includes a charge pump unit, a current supply unit, a first output unit, and a second output unit.

In this converter, the charge pump unit may be positioned between a first node and a second node, and may store electric charges flowing into the first node and the second node through a first capacitor, or may supply electric charges to the second node. In addition, the current supply unit may: include an inductor positioned between an input node and the first node; build up current in the inductor in the first time period; and transfer the current of the inductor to the charge pump unit in the second time period. In addition, the first output unit may include a second capacitor connected to a first output node, and may move electric charges from the second capacitor to the first capacitor in the first time period. Further, the second output unit may include a third capacitor connected to a second output node, and may move electric charges from the first capacitor to the third capacitor in the second time period.

In this converter, the first node may be connected to a low-voltage portion and the second node may be connected to the first output unit in the first time period, and the second node may be connected to the second output unit in the second time period. In addition, the converter may repeat the operation in the first time period and the operation in the second time period. Here, the low-voltage portion may be a ground.

In this converter, the voltage of the first node may be higher than the voltage of the second node, wherein the first output unit may output a negative voltage and the second output unit may output a positive voltage. In another aspect, the converter may output voltages of different polarities through the first output unit and the second output unit.

In another aspect, the present invention provides a single-inductor multi-output converter that includes an inductor, a first switch, a first capacitor, a second capacitor, a third capacitor, a second switch, and a third switch.

In this converter, one side of the inductor may be connected to an input node and the other side thereof may be connected to a first node. In addition, one side of the first switch may be connected to the first node and the other side thereof may be connected to a low-voltage portion. In addition, one side of the first capacitor may be connected to the first node and the other side thereof may be connected to a second node. In addition, the second capacitor may supply a first voltage to a first output node, and the third capacitor may supply a second voltage to a second output node. In addition, one side of the second switch may be connected to the second node and the other side thereof may be connected to the second capacitor. Further, one side of the third switch may be connected to the second node and the other side thereof may be connected to the third capacitor.

In this converter, electric charges of the second capacitor may move to the first capacitor in the overlapping period of a switch-on period of the first switch and a switch-on period of the second switch.

In this converter, electric charges of the first capacitor may move to the third capacitor in the overlapping period of a switch-off period of the first switch and a switch-on period of the third switch.

In this converter, the first switch may be turned on and the current of the inductor may increase in the first time period. The first switch may be turned off, the third switch may be turned on, and the current of the inductor may flow through the third switch in the second time period, wherein the first time period and the second time period may be repeated. In addition, the second switch may be turned on in the first time period.

In this converter, the voltage of the first node may be higher than the voltage of the second node. Furthermore, in this converter, the first voltage may be a negative voltage and the second voltage may be a positive voltage.

As described above, according to the present invention, there is an effect in which the converter outputs two or more voltages by means of a single inductor. Accordingly, this brings about advantages in which the volume of the converter can be reduced and the unit price thereof can be lowered.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
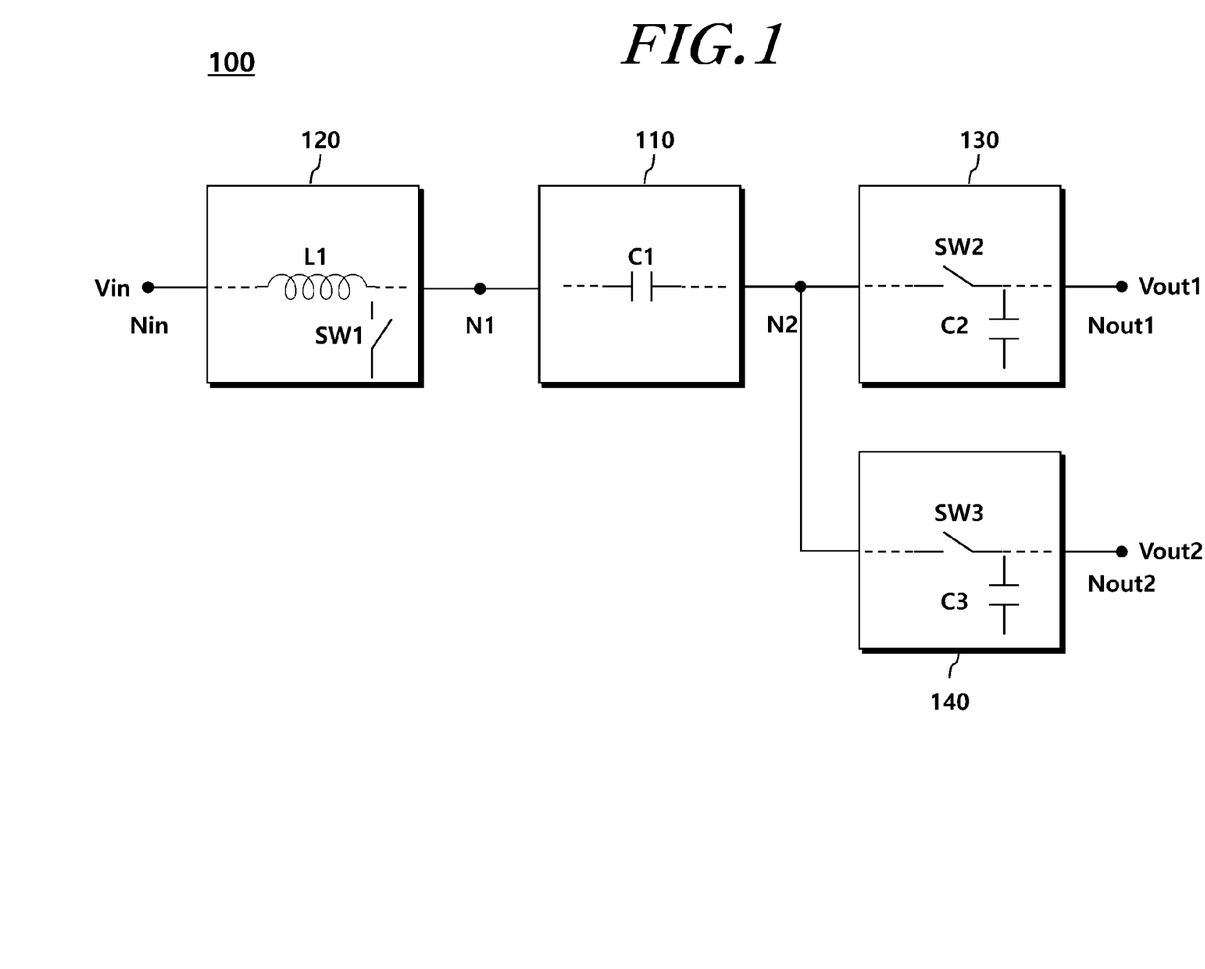
FIG. 1 is a configuration diagram of a converter, according to an embodiment.

FIG. 1 is a configuration diagram of a converter, according to an embodiment.

The converter (100), according to an embodiment, may be referred to as a single-inductor multi-output converter in a sense in which it outputs two or more voltages using a single inductor, but the present invention is not limited thereto. The converter (100) may include two or more inductors in order to implement additional functions.

Referring to FIG. 1, the converter (100) may include a charge pump unit (110), a current supply unit (120), a first output unit (130), a second output unit (140), and the like. In addition, a first node (N1) may be formed between the charge pump unit (110) and the current supply unit (120). In addition, a second node (N2) may be formed between the charge pump unit (110) and the first and second output units (130) and (140).

The charge pump unit (110) may be positioned between the first node (N1) and the second node (N2), and may store electric charges that flow into the first node (N1) and the second node (N2) through a first capacitor (C1), or may supply electric charges to the second node (N2). Although the element (110) is referred to as a charge pump unit in a sense in which electric charges flow into or out of the same, it should not be construed to be limited thereto.

The current supply unit (120) may be positioned between an input node (Nin) and the first node (N1), and may include an inductor (L1) therein. In addition, the current supply unit (120) may build up current in the inductor (L1) in the first time period, and may transfer the current of the inductor (L1) to the charge pump unit (110) in the second time period.

The converter (100) may repeatedly operate two or more modes according to a specific frequency. One of the two modes is operated in the first time period, and the other thereof is operated in the second time period. The current supply unit (120) may build up current (store energy in another aspect) in the inductor (L1) in the first time period, and may transfer the current of the inductor (L1) to the charge pump unit (110) in the second time period.

The current supply unit (120) may further include a first switch (SW1) in order to operate in different modes in the first time period and the second time period.

The current supply unit (120) may turn on the first switch (SW1) in the first time period in order to thereby build up current in the inductor (L1) using an input voltage (Vin), and may turn off the first switch (SW1) in the second time period in order to thereby transfer the current of the inductor (L1) to the charge pump unit (110).

The first output unit (130) may include a second capacitor (C2) that is connected to a first output node (Nout1), and may move electric charges from the second capacitor (C2) to the first capacitor (C1) in the first time period. In addition, the first output unit (130) may output a first voltage (Vout1) to a load connected to the first output node (Nout1).

The first output unit (130) may further include a second switch (SW2), wherein the second switch (SW2) may be turned on in the first time period, and may be turned off in the second time period.

The first output unit (130) may turn on the second switch (SW2) to connect the second capacitor (C2) to the charge pump unit (110) in the first time period. At this time, electric charges may move from the second capacitor (C2) to the first capacitor (C1).

The second output unit (140) may include a third capacitor (C3) that is connected to the second output node (Nout2), and may move electric charges from the first capacitor (C1) to the third capacitor (C3) in the second time period. In addition, the second output unit (140) may output a second voltage (Vout2) to a load connected to the second output node (Nout2).

The second output unit (140) may further include a third switch (SW3), wherein the third switch (SW3) may be turned off in the first time period, and may be turned on in the second time period.

The second output unit (140) may turn on the third switch (SW3) in the second time period to connect the third capacitor (C3) to the charge pump unit (110). At this time, electric charges may move from the first capacitor (C1) to the third capacitor (C3).

Figure 2:
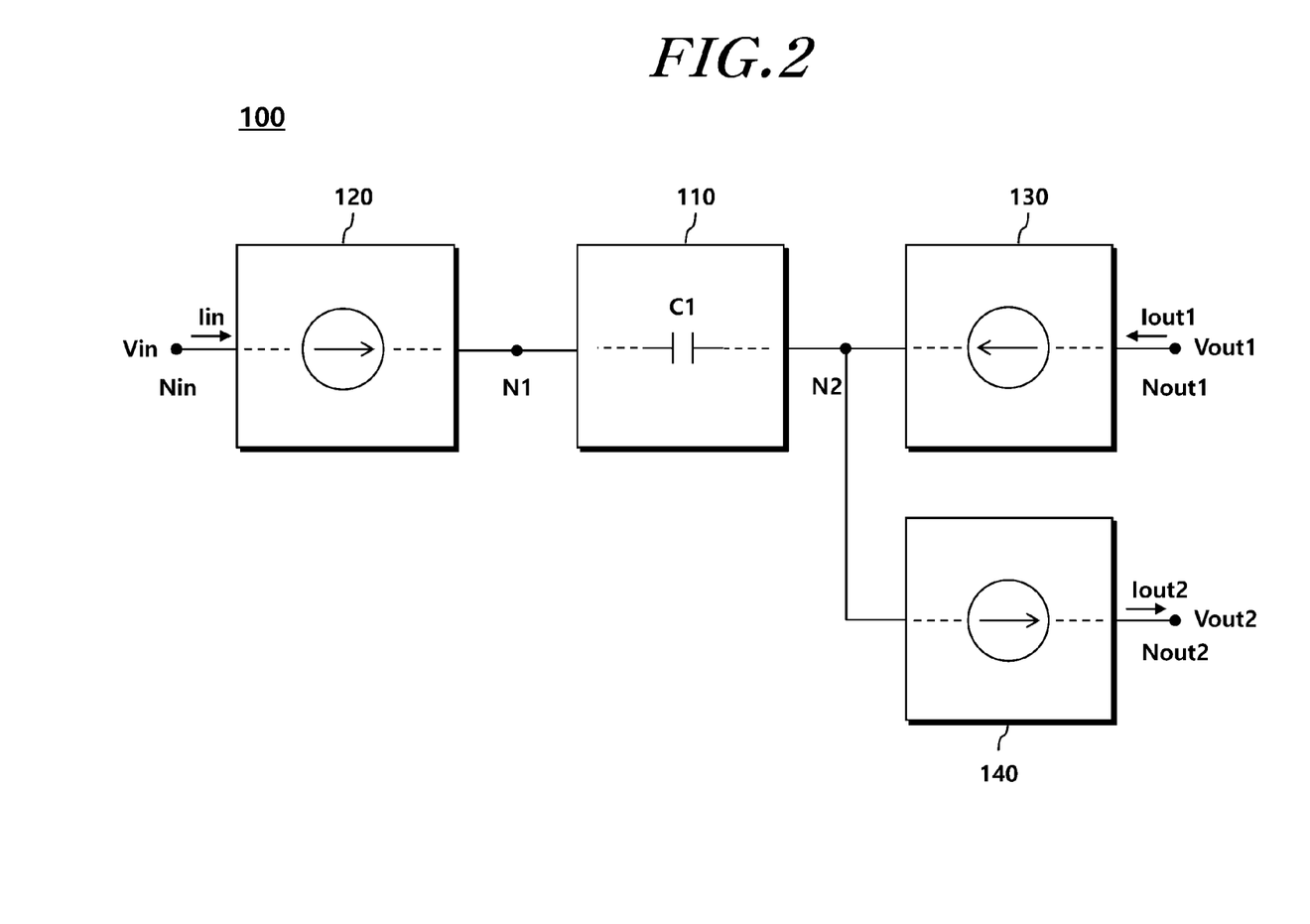
FIG. 2 is a conceptual diagram to explain the operation of a converter, according to an embodiment.

FIG. 2 is a conceptual diagram to explain the operation of a converter, according to an embodiment.

Referring to FIGS. 1 and 2, the current supply unit (120) may act as a current source for supplying a current (Iin) to the converter (100), and the first output unit (130) may act as a current sink for absorbing a current (Iout1) of the load. Further, the second output unit (140) may act as a current source for supplying a current (Iout2) to the load.

The current supply unit (120) may shape the input current (Iin) in a manner in which the current supply unit (120) builds up current in the inductor (L1) and then outputs the same. At this time, the input current (Iin) may include ripples because it is repeatedly built up, but the input current (Iin) may have a constant average current value.

The first output unit (130) may supply a constant level of voltage (it may include ripples) to the load through the second capacitor (C2). At this time, the first output unit (130) may absorb the current (Iout1) from the load, and may store the same in the second capacitor (C2). The current (substantially, electric charges) stored in the second capacitor (C2) may move to the first capacitor (C1) in order to thereby maintain a constant level of voltage (Vout1).

The second output unit (140) may supply a constant level of voltage (it may include ripples) to the load through the third capacitor (C3). At this time, the second output unit (140) may supply the current (Iout2) to the load using the electric charges stored in the third capacitor (C3). The electric charges consumed in the third capacitor (C3) may be supplied again by the first capacitor (C1) so that the second output unit (140) can constantly maintain a constant level of voltage (Vout2).

The respective elements of the converter (100) may have different connection relationships in each mode depending on switch-on/off.

Figure 3:
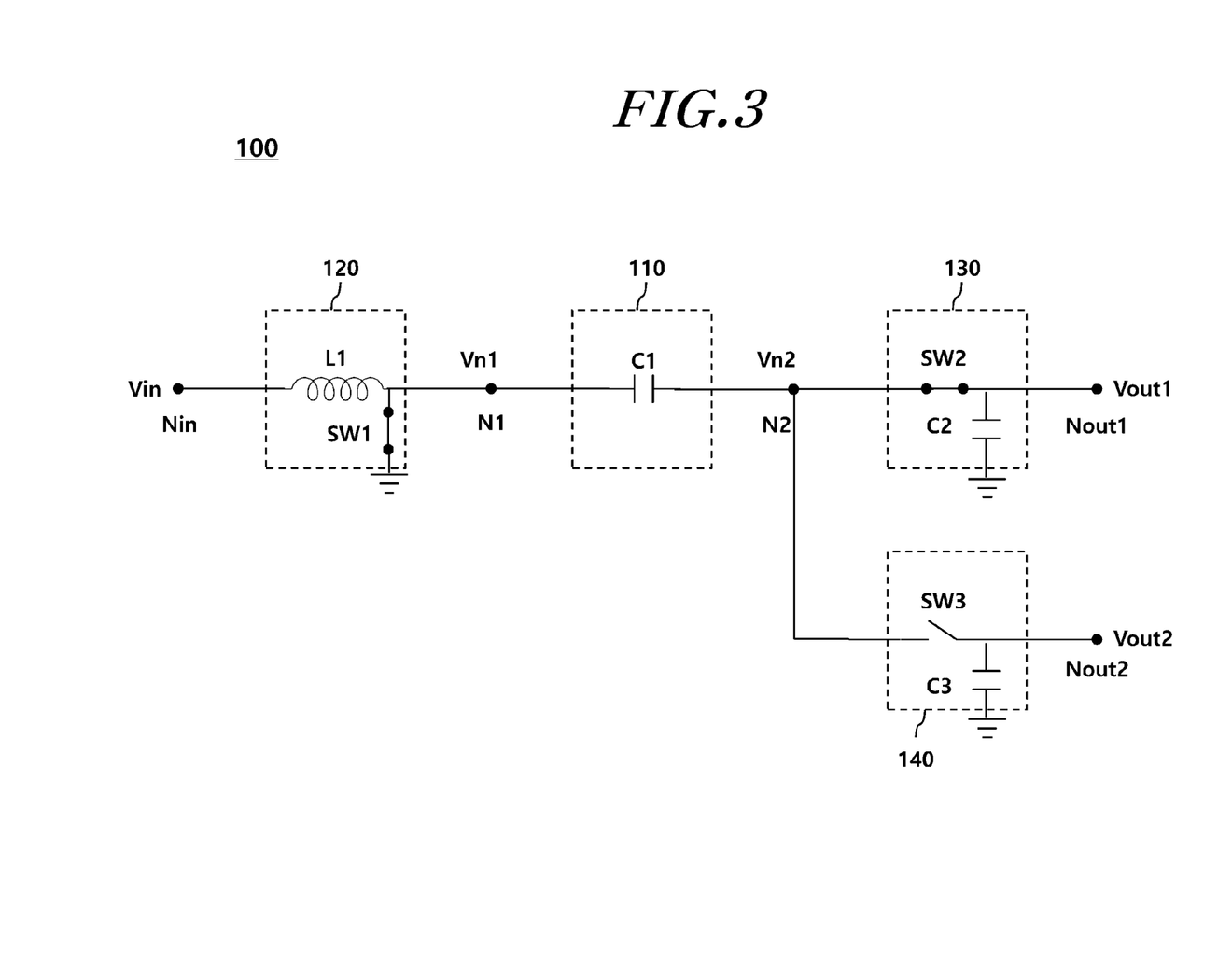
FIG. 3 is a circuit connection diagram of respective elements of a converter in the first time period.
Figure 4:
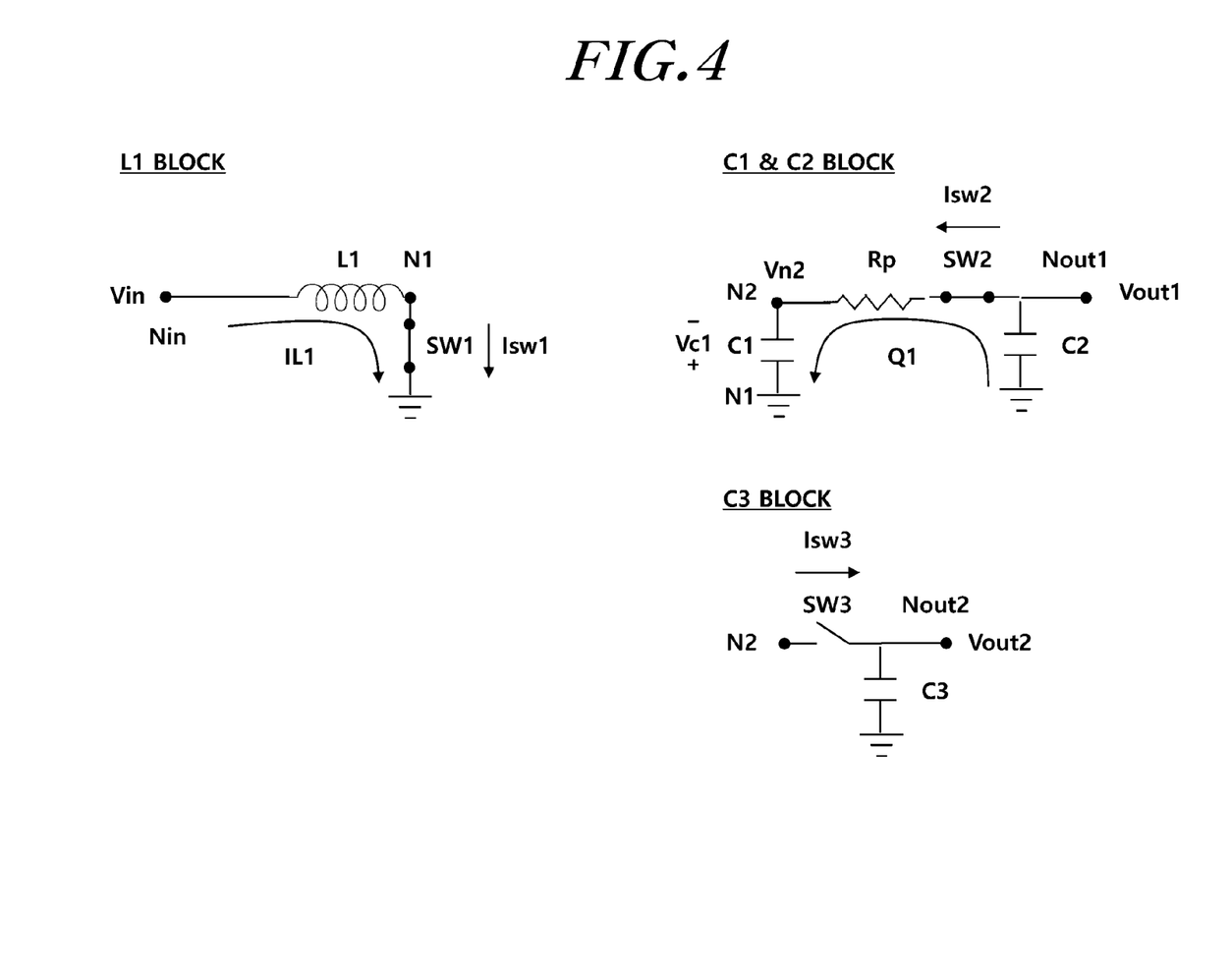
FIG. 4 is a diagram showing the modeling of each block of FIG. 3.
Figure 5:
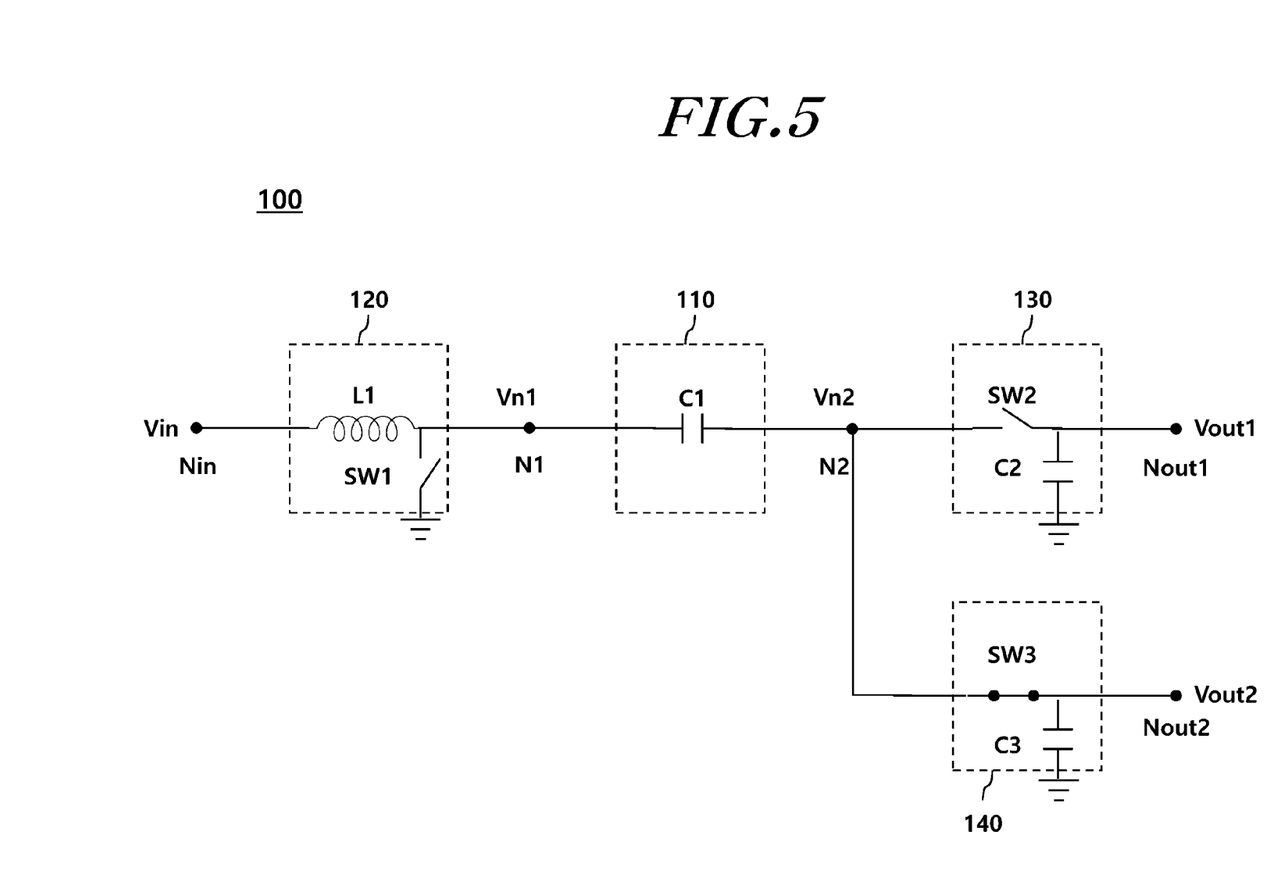
FIG. 5 is a circuit connection diagram of respective elements of a converter in the second time period.
Figure 6:
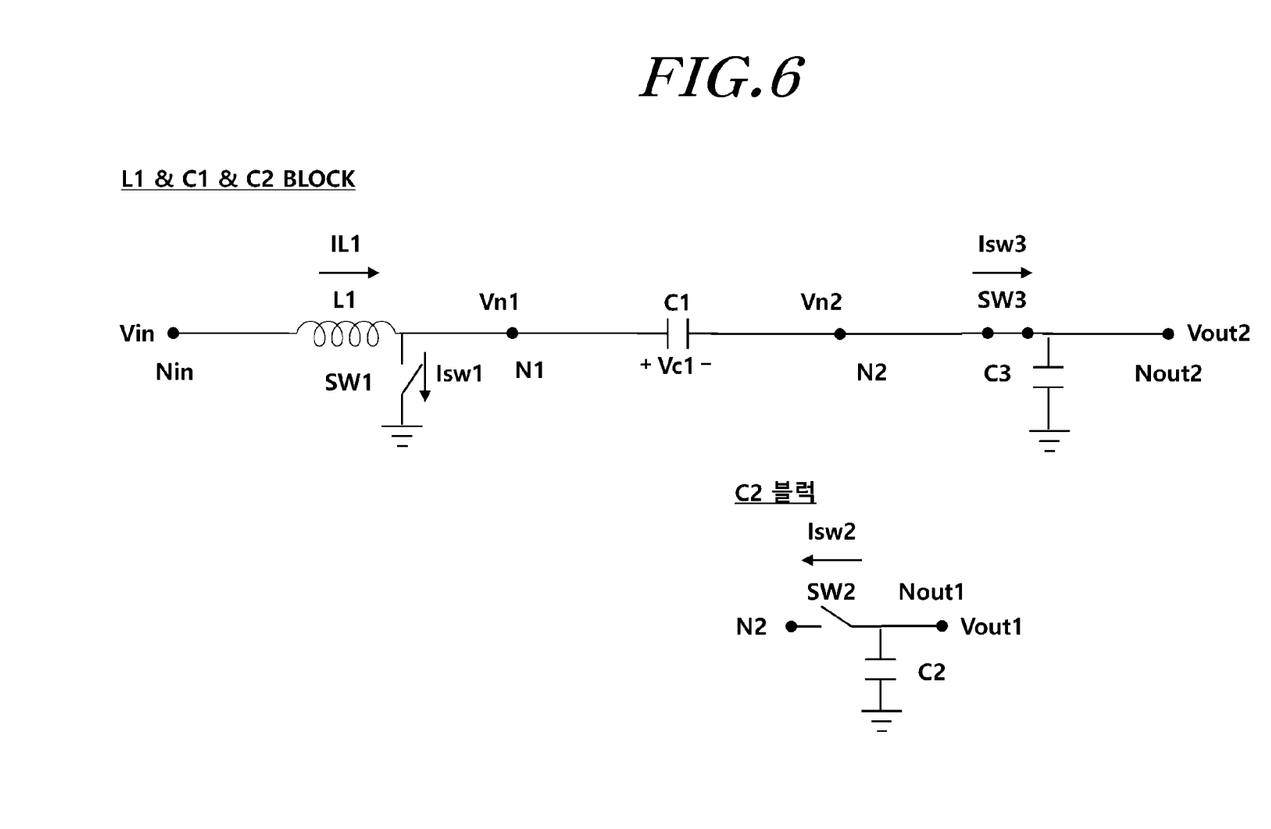
FIG. 6 is a diagram showing the modeling of each block of FIG. 5.
Figure 7:
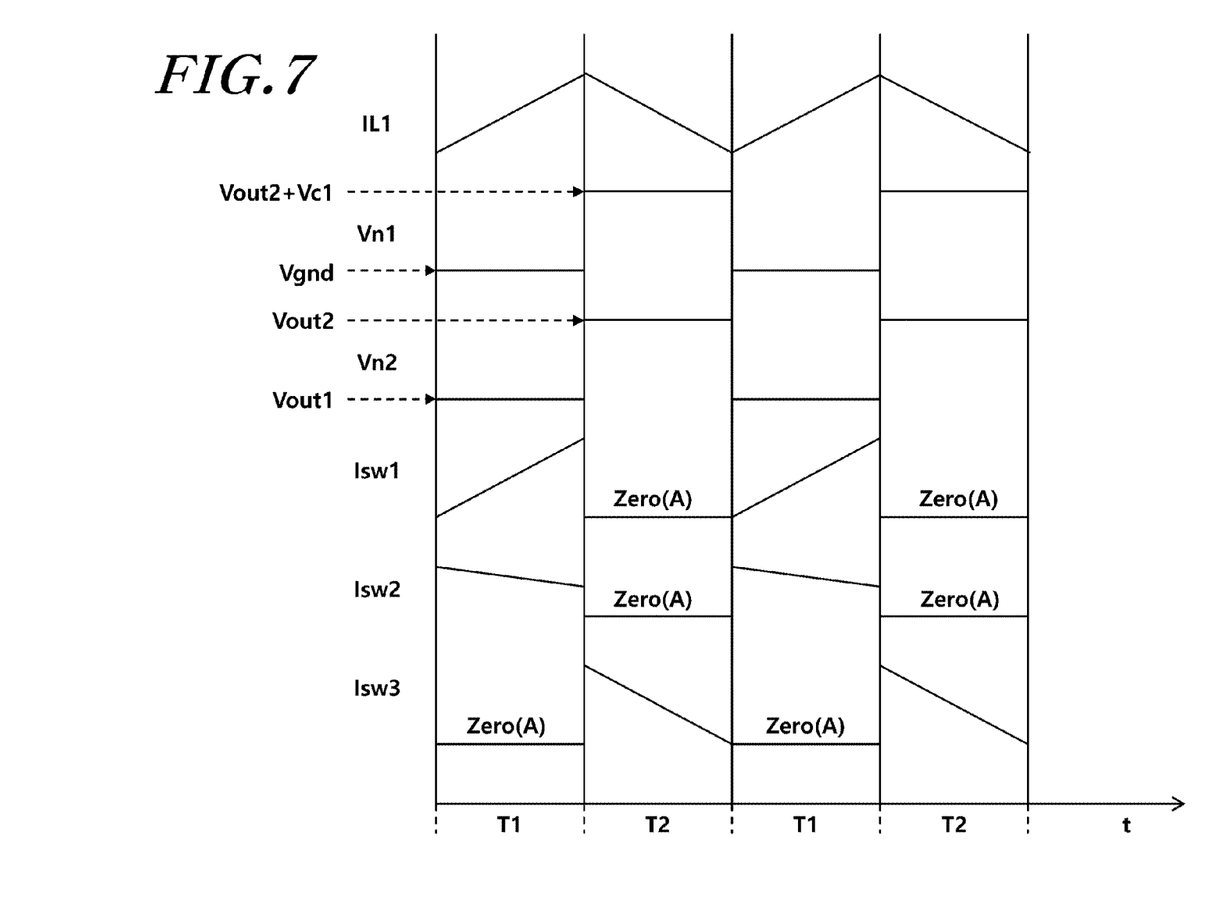
FIG. 7 is a current or voltage waveform diagram of main portions.

FIG. 3 is a circuit connection diagram of respective elements of the converter in the first time period, and FIG. 4 is a diagram showing the modeling of each block of FIG. 3. In addition, FIG. 5 is a circuit connection diagram of respective elements of the converter in the second time period, and FIG. 6 is a diagram showing the modeling of each block of FIG. 5. Further, FIG. 7 is a current or voltage waveform diagram of main portions.

One side of the inductor (L1) may be connected to the input node (Nin) and the other side thereof may be connected to the first node (N1) and the first switch (SW1). In addition, one side of the first switch (SW1) may be connected to the first node (N1) and the other side thereof may be connected to a low-voltage portion (e.g., ground).

The first switch (SW1) may be turned on in the first time period (T1), and may be turned off in the second time period (T2).

Referring to FIGS. 3 and 4, an input voltage (Vin) may be connected to one side of the inductor (L1) in the first time period (T1), and a low-voltage portion (e.g., ground) may be connected to the other side thereof. According to this, an inductor current (IL1) is built up in the inductor (L1), and the magnitude of the inductor current (IL1) increases at a constant slope as shown in FIG. 7. The inductor current (IL1) flows into the first switch (SW1) in the first time period (T1).

Meanwhile, one side of the first capacitor (C1) may be connected to the first node (N1) and the other side thereof may be connected to the second node (N2).

In addition, since the first node (N1) is connected to the low-voltage portion in the first time period (T1) in which the first switch (SW1) is turned on, one side of the first capacitor (C1) may be fixed with the voltage of the low-voltage portion (e.g., ground).

A first capacitor voltage (Vc1) of a constant level may be formed on both ends of the first capacitor (C1). Although a current flows into or out of the first capacitor (C1) according to the operation of the converter (100), when the capacitance of the first capacitor (C1) is much larger than the inflow/outflow current, the first capacitor voltage (Vc1) can be maintained to be a constant level at both ends of the first capacitor (C1).

The voltage of the second node (N2) may be determined as the first capacitor voltage (Vc1) because one side of the first capacitor (C1) is connected to the low-voltage portion and the first capacitor voltage (Vc1) is formed at both ends thereof. Since the voltage (Vn2) of the second node (N2) is lower than the voltage (Vn1) of the first node (N1) at both ends of the first capacitor (C1), the voltage (Vn2) of the second node (N2) may have a negative value in the first time period (T1) in which the first node (N1) is connected to the low-voltage portion. The magnitude of the negative voltage formed in the second node (N2) may be equal to the first capacitor voltage (Vc1).

Meanwhile, one side of the second switch (SW2) may be connected to the second node (N2) and the other side thereof may be connected to the second capacitor (C2), wherein the second switch (SW2) may be turned on in the first time period (T1), and may be turned off in the second time period (T2).

The second capacitor (C2) may be connected to the first capacitor (C1) in the first time period (T1) in which the second switch (SW2) is turned on. One side of the second capacitor (C2) is connected to the low-voltage portion and the other side thereof is connected to the first output node (Nout1). At this time, since the second node (N2) and the first output node (Nout1) are connected by the second switch (SW2) in the first time period (T1), the electric charges (Q1) move in the direction in which the voltage (Vn2) of the second node (N2) is equal to the voltage (Vout1) of the first output node (Nout1). In another aspect, the electric charges (Q1) of the second capacitor (C2) move to the first capacitor (C1) in the overlapping period of a switch-on period of the first switch (SW1) and a switch-on period of the second switch (SW2).

Although the first capacitor voltage (Vc1) can be maintained to be similar to the first voltage (Vout1), the voltage (the first voltage Vout1) of the second capacitor (C2) is somewhat higher than the first capacitor voltage (Vc1) because the second capacitor (C2) absorbs the load current. Accordingly, the electric charges of the second capacitor (C2) move to the first capacitor (C1) in the first time period.

When the electric charges (Q1) move from the second capacitor (C2) to the first capacitor (C1), the parasitic impedance (Rp) may limit the moving speed of the electric charge (Q1).

Referring to FIG. 7, a conduction current (Isw2) of the second switch (SW2) is limited by the difference between the first voltage (Vout1) and the second node voltage (Vn2) and the parasitic impedance (Rp), and decreases depending on time. The reduction of the current is due to the fact that the difference between the first voltage (Vout1) and the second node voltage (Vn2) is reduced.

Meanwhile, one side of the third switch (SW3) may be connected to the second node (N2) and the other side thereof may be connected to the third capacitor (C3). In addition, the third switch (SW3) may be turned off in the first time period (T1), and may be turned on in the second time period (T2).

The third capacitor (C3) may supply the second voltage (Vout2) to the load through the second output node (Nout2) in the first time period (T1) in which the third switch (SW3) is turned off. At this time, since the third switch (SW3) is turned off, the current (Isw3) flowing into the third switch (SW3) is 0 A.

Referring to FIGS. 5 and 6, the first switch (SW1) may be turned off, the second switch (SW2) may be turned off, and the third switch (SW3) may be turned on in the second time period (T2).

According to this, the input voltage (Vin), the inductor (L1), the first capacitor (C1), and the second capacitor (C2) are connected in series in the second time period (T2) as shown in FIG. 6.

Since the second node (N2) is connected to the third capacitor (C3) in the second time period (T2), the second node voltage (Vn2) becomes equal to the second voltage (Vout2). In addition, since the first capacitor voltage (Vc1) is maintained to be a constant level, the first node voltage (Vn1) becomes a voltage (Vout2+Vc1) corresponding to a sum of the second voltage (Vout2) and the first capacitor voltage (Vc1).

The inductor current (IL1) decreases in the second time period (T2) because the first node voltage (Vn1) is higher than the input voltage (Vin). However, since the inductor current (IL1) may be greater than 0 A even with the reduction thereof, the third capacitor (C3) can be charged with the inductor current (IL1). In terms of the movement of an electric charge, the electric charges of the first capacitor (C1) move to the third capacitor (C3) in the overlapping period (the second time period T2) of a switch-off period of the first switch (SW1) and a switch-on period of the third switch (SW3).

Taking all the first time period (T1) and the second time period (T2) together, the first switch (SW1) is turned on and the inductor current (IL1) increases in the first time period (T1). In addition, in the second time period (T2), the first switch (SW1) is turned off, the third switch (SW3) is turned on, and the inductor current (IL1) flows through the third switch (SW3) in order to thereby supply electric charges to the third capacitor (C3).

As shown in FIG. 7, the converter (100) can maintain a steady state by repeating the first time period (T1) and the second time period (T2).

An embodiment of the present invention has been described above. The proposed embodiment can be applied to an application that receives a single input voltage and outputs two voltages. As an example, a converter according to an embodiment may: form a negative voltage and a positive voltage; output a positive voltage to one side of a single load; and output a negative voltage to the other side of the single load. As another example, a converter according to an embodiment may: form a negative voltage and a positive voltage; output a positive voltage to one load with respect to symmetrical loads; and output a negative voltage to the other load.

Meanwhile, although the first output node and the second output node have been described as output terminals in an embodiment, the first output node or the second output node may be used as an input terminal according to embodiments. For example, a voltage source having a negative voltage may be connected to the first output node, and a voltage source having a positive voltage may be connected to the second output node. In this case, only one of the first output node or the second output node can be used as an output node.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A single-inductor multi-output converter comprising;
an inductor configured to have one side connected to an input node and another side connected to a first node;
a first switch configured to have one side connected to the first node and another connected to a low-voltage portion;
a first capacitor configured to have one side connected to the first node and another connected to a second node;
a second capacitor configured to supply a first voltage to a first output node;
a third capacitor configured to supply a second voltage to a second output node;
a second switch configured to have one side connected to the second node and another side connected to the second capacitor; and
a third switch configured to have one side connected to the second node and another connected to the third capacitor,
wherein electric charges of the second capacitor move to the first capacitor in an overlapping period of a switch-on period of the first switch and a switch-on period of the second switch.

2. The single-inductor multi-output converter according to claim 1, wherein electric charges of the first capacitor move to the third capacitor in an overlapping period of a switch-off period of the first switch and a switch-on period of the third switch.

3. The single-inductor multi-output converter according to claim 1, wherein the first switch is turned on and the current of the inductor increases in a first time period, wherein the first switch is turned off, the third switch is turned on, and the current of the inductor flows through the third switch in a second time period, and wherein the first time period and the second time period are repeated.

4. The single-inductor multi-output converter according to claim 3, wherein the second switch is turned on in the first time period.

5. The single-inductor multi-output converter according to claim 1, wherein a voltage of the first node is higher than a voltage of the second node.

6. The single-inductor multi-output converter according to claim 1, wherein the first voltage is a negative voltage and the second voltage is a positive voltage.

\* \* \* \* \*